United States Patent [19]

Park

[11] Patent Number: 5,247,362
[45] Date of Patent: Sep. 21, 1993

[54] ADAPTIVE NOISE REDUCTION APPARATUS USING MOTION DETECTION SIGNAL

[75] Inventor: Woo Park, Kyunggi-do, Rep. of Korea

[73] Assignee: Samsung Electronics Co., Ltd., Kyunggi-do, Rep. of Korea

[21] Appl. No.: 813,512

[22] Filed: Dec. 26, 1991

[30] Foreign Application Priority Data

Dec. 28, 1990 [KR] Rep. of Korea .......... 90-22110

[51] Int. Cl.$^5$ .......................................... H04N 5/213
[52] U.S. Cl. ........................................ 358/167; 358/36
[58] Field of Search ................ 358/167, 166, 36, 37, 358/105

[56] References Cited

U.S. PATENT DOCUMENTS

| | | | |
|---|---|---|---|
| 4,242,704 | 12/1980 | Ito et al. | 358/36 |
| 4,500,911 | 2/1985 | Ninomiya et al. | 358/167 |
| 4,658,285 | 4/1987 | Lewis, Jr. | 358/36 |
| 4,951,137 | 8/1990 | Kisou et al. | 358/167 |
| 5,140,424 | 8/1992 | Yoshimura et al. | 358/167 |

*Primary Examiner*—James J. Groody
*Assistant Examiner*—Glenton B. Burgess
*Attorney, Agent, or Firm*—Leydig, Voit & Mayer

[57] ABSTRACT

A noise reduction apparatus is disclosed which comprises a horizontal motion compensator, a subtractor, a memory, NOR and OR gates, a current frame value altering unit, an adder, and delaying units, thereby greatly enhancing background picture quality of a picture and preventing after-image of a motion picture.

2 Claims, 2 Drawing Sheets

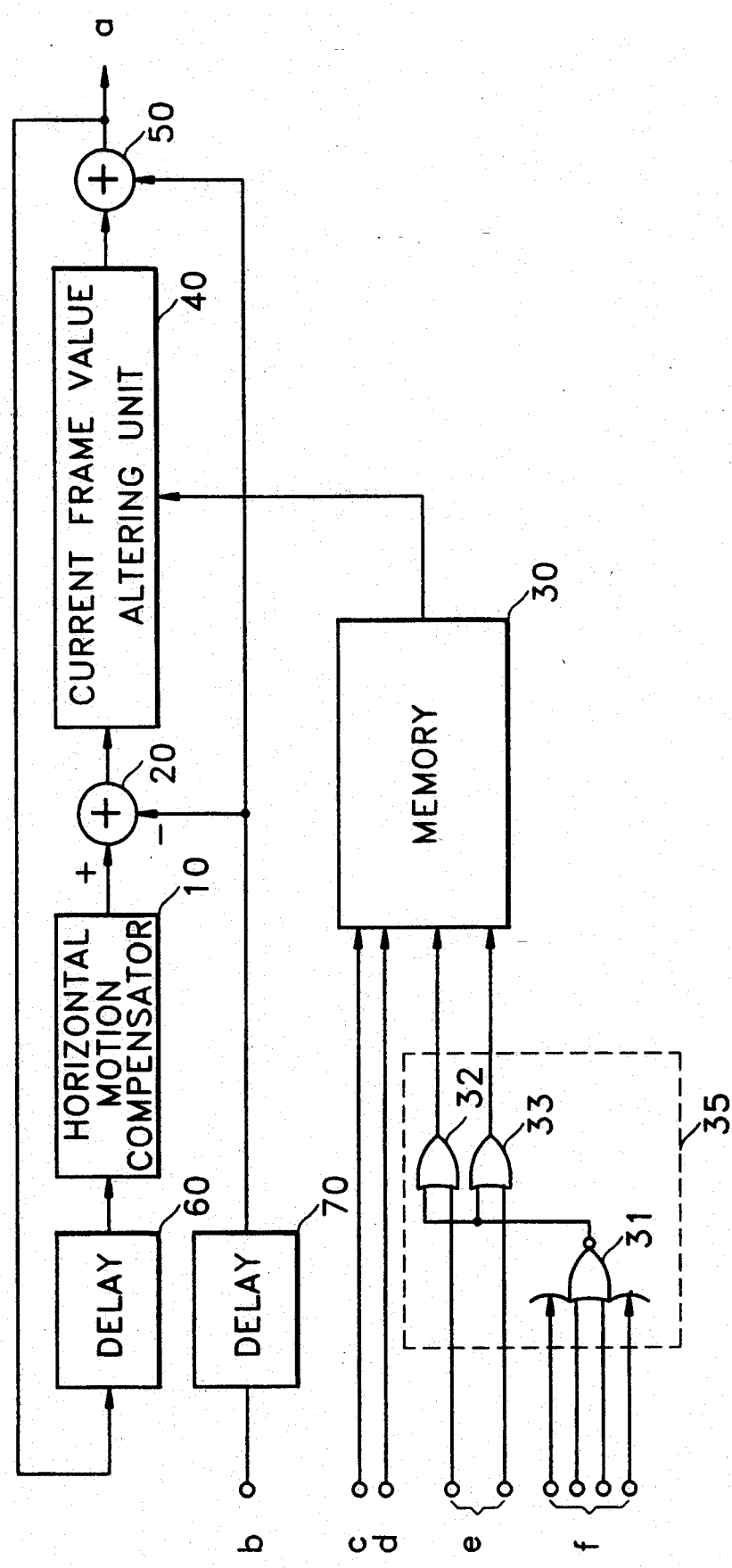

ADAPTIVE NOISE REDUCTION APPARATUS USING MOTION DETECTION SIGNAL

BACKGROUND OF THE INVENTION

The present invention relates to an adaptive noise reduction apparatus, and more particularly to an apparatus in a MUSE decoder for a high definition television (HDTV) system, which uses a motion detection signal. A noise reduction function for an image signal can be always be performed at its maximum in still pictures, so as to obtain the image signal having a amount of analog noise. However, in motion pictures, the noise reduction function can be performed only in a predetermined noise level above, so as to prevent an afterimage.

According to the conventional noise reduction apparatus for a MUSE decoder shown in FIG. 1, a subtractor 20 receives an 8-bit noise reduced signal a, being a final output signal of the above apparatus, as a feedback signal via a horizontal motion compensator 10. Subtrator 20 also receives an 8-bit current frame image signal b from a de-emphasis unit (not shown) and subtracts the latter from the former, and transmits the result to a current frame value altering unit 40. A memory 30 produces a signal representing the desired amount of noise reduction upon reception of a non-linear edge signal d from a memory switch (not shown) and a noise level detection signal e from a noise level detector (not shown), and transmits the produced signal to current frame value altering unit 40. Thus, current frame value altering unit 40 alters the value of the subtracted image signal from subtractor 20 to an appropriate value in accordance with the noise reduction signal from memory 30.

An adder 50 receives and adds the altered current frame value from current frame value altering unit 40 and the 8-bit current frame image signal b from the de-emphasis unit (not shown) to output a noise reduced signal a. This operation allows an adequate low-pass filtering effect to be obtained. In FIG. 1, a signal c is a select signal for carrying out the noise reduction function either automatically or manually.

As described above with respect to the conventional noise reduction apparatus, since noise reduction function cannot be performed below a certain noise level, the analog noise of the image's background cannot be eliminated in a still picture. Further, afterimage occurs in a motion picture when the noise reduction function is forcibly facilitated by manual manipulation resulting in a bad picture.

SUMMARY OF THE INVENTION

Therefore, the present invention is directed to solve the drawbacks in the conventional apparatus as mentioned above and it is an object of the present invention to provide a noise reduction apparatus which sets the maximum of noise reduction value in a still picture, and which starts to perform the noise reduction function from the noise level above a certain value in a motion picture, wherein the noise level included in an image signal is below a certain value using a luminance motion detection signal.

To accomplish the object of the present invention, there is provided a noise reduction apparatus comprising a horizontal motion compensator for compensating for a horizontal movement of an image signal when image moves horizontally in a quasi-motionless state, a subtractor for subtracting a current frame image signal from an output signal of the horizontal motion compensator, a memory for receiving a non-linear edge signal, and a logical combination value of a noise level detection signal and a luminance motion detection signal, as address signals and for producing a signal deciding the amount of noise reduction, gate means for receiving a luminance motion detection signal having a plurality of bits and performing a logical combination of the received signal, so as to combine the logical combination result with the noise level detection signal, respectively, for the purpose of feeding the combined signal to the memory, a current frame value altering unit for altering the frame difference value of the subtracted image signal from the subtractor according to the output signal of the memory, an adder for summing the output signal of the current frame value altering unit and the current frame image signal to produce a noise-reduced signal which is fed back to the horizontal motion compensator, a first delaying unit for delaying for a predetermined time the noise-reduced signal to be fed back to the horizontal motion compensator, and a second delaying unit for delaying for a predetermined time the current frame image signal to be transmitted to the subtractor and the adder.

BRIEF DESCRIPTION OF THE DRAWINGS

The above object and other advantages of the present invention will become more apparent by describing in detail a preferred embodiment of the present invention with reference to the attached drawings in which:

FIG. 2 is a block diagram of a noise reduction apparatus according to the present invention.

DETAILED DESCRIPTION OF THE INVENTION

Figure 1:
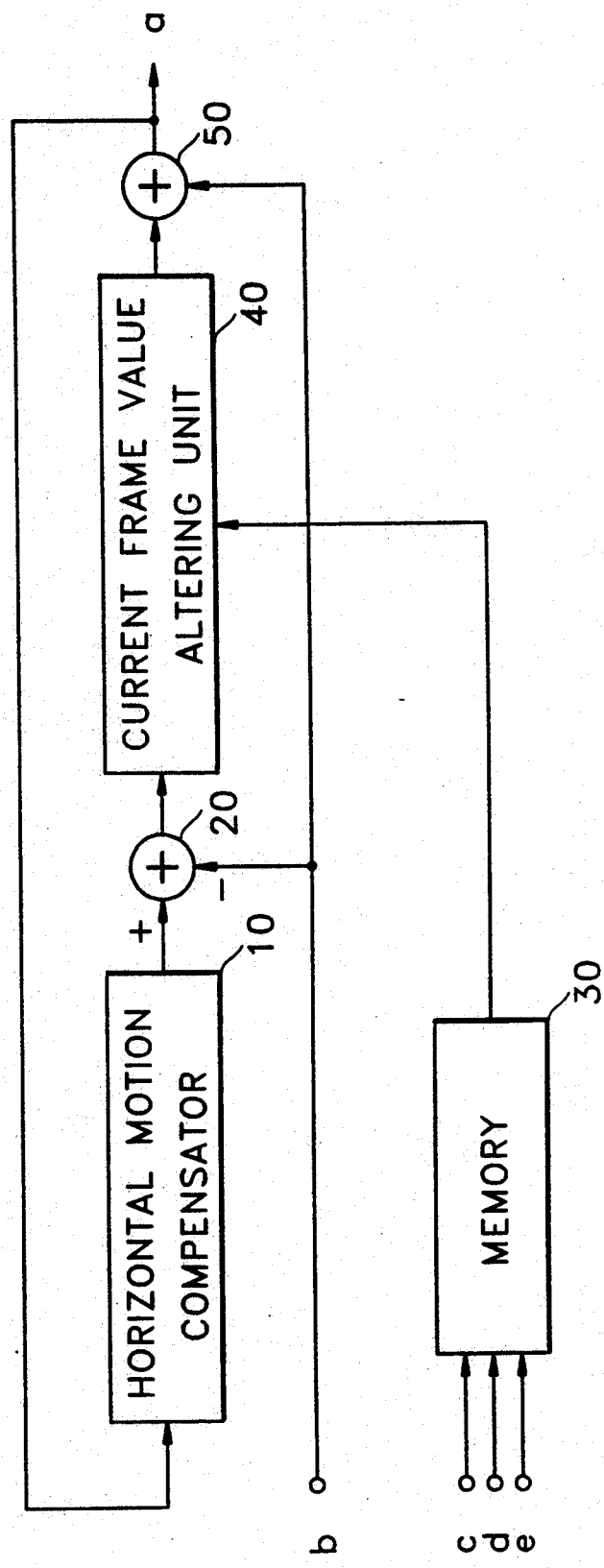
FIG. 1 is a block diagram of a conventional noise reduction apparatus.

Referring to FIG. 2, in a noise reduction apparatus according to the present invention, a horizontal motion compensator 10 compensates for "a" noise reduced signal "a" being an output signal of the above apparatus when image moves horizontally in a quasi-motionless state. A subtractor 20 subtracts a current frame image signal b input from a de-emphasis unit (not shown) from a signal output from horizontal motion compensator 10. A memory 30 receives a non-linear edge signal d from the de-emphasis unit, a noise level detection signal e from a noise level detector (not shown), and a luminance motion detection signal f and decides the amount of noise reduction. Gate means 35 consists of a NOR gate 31 and two OR gates 32 and 33 so as to receive and logically combine a 4-bit luminance motion detection signal f input from a motion detector (not shown) and to logically sum the logic signal with a 2-bit noise level detection signal e to be supplied to memory 30. A current frame value altering unit 40 alters the frame difference value of the image signal subtracted and input from subtractor 20 according to the output signal of memory 30. An adder 50 adds the output of current frame value altering unit 40 and the current frame image signal b to output a noise-reduced signal a which is input to horizontal motion compensator 10 via a first delaying unit 60. A second delaying unit 70 delays for a predetermined time the current frame image signal b to be transmitted to subtractor 20 and adder 50 so as to match the 4-bit luminance motion detection signal f.

Operation of the noise reduction apparatus will be described below in more detail.

As an address, memory 30 consisting of a ROM for deciding a noise reduction amount, receives an automatic/manual operation select signal c as a most significant bit (MSB), and a non-linear edge signal d as a bit next to the most significant bit and a noise level detection signal e as two lower bits.

Here, signals applied to the memory 30 are composed of four bits, wherein the automatic/manual operation select signal c and the non-linear edge signal d take one bit, respectively, and the noise level detection signal e has 2 bits.

The NOR gate 31 receives the 4-bit luminance motion detection signal f and performs a NOR-gating operation. Subsequently, the logical result of NOR gate 31 is applied to OR gates 32 and 33, respectively. When the applied signal is a still image signal, namely four bits of the luminance motion detection signal f are all "0", the input of memory 30, i.e., the two lower address bits, become "1".

When the lower address bits of memory 30 are both "1", as shown in the TABLE, the output level of memory 30 are "11" regardless of the automatic/manual operation select signal c, the non-linear edge signal d, or the noise level detection signal e.

When the output levels of memory 30 are "11", current frame value altering unit 40 alters a current frame value to an appropriate value at output timing of the current frame according to a sub-sample phase so as to maximize the noise reduction.

TABLE

| memory's input address | | | | memory's noise reduction amount deciding signal | |
|---|---|---|---|---|---|
| automatic/manual operation select signal | nonlinear edge signal | noise level detection signal | | | |
| 0 | 0 | 0 | 0 | 0 | 0 |
|   |   | 0 | 1 | 0 | 1 |
|   |   | 1 | 0 | 1 | 0 |
|   |   | 1 | 1 | 1 | 1 |
|   | 1 | 0 | 0 | 0 | 0 |
|   |   | 0 | 1 | 0 | 1 |
|   |   | 1 | 0 | 1 | 0 |
|   |   | 1 | 1 | 1 | 1 |
| 1 | 0 | 0 | 0 | 0 | 0 |
|   |   | 0 | 1 | 0 | 1 |
|   |   | 1 | 0 | 1 | 0 |
|   |   | 1 | 1 | 1 | 1 |
|   | 0 | 0 | 0 | 0 | 0 |
|   |   | 0 | 1 | 0 | 1 |
|   |   | 1 | 0 | 1 | 0 |
|   |   | 1 | 1 | 1 | 1 |

However, when the applied image signal is a motion image signal, the amount of noise reduction according to the non-linear edge signal d and noise level is controlled by the conventional method because the output level of NOR gates 31 is "0".

Meanwhile, first and second delaying units 60 and 70 are provided to respectively synchronize the phase of the 4-bit luminance motion detection signal f applied to NOR gate 31 with those of the fed back noise reduced image signal "a" and the current frame image signal b.

As described above, the apparatus according to the present invention can greatly enhance the quality of a background picture and prevent after-image of a motion picture by reducing noise included in a MUSE signal in a MUSE decoder, HD-VTR, or video disk player (VDP).

While the invention has been particularly shown and described with reference to preferred embodiments thereof, it will be understood by those skilled in the art that various changes in form and details may be made therein without departing form the spirit and scope of the invention as defined by the appended claims.

What is claimed is:

1. An adaptive noise reduction apparatus in a MUSE decoder comprising:

a horizontal motion compensator for compensating for a horizontal movement of an image signal when an image moves horizontally in a quasi-motionless state;

a subtractor for subtracting a current frame image signal from an output signal from said horizontal motion compensator;

logic gates which receive a luminance detection signal having a plurality of bits, said logic gates performing a logical combination of the luminance detection signal;

means for logically combining the logical combination of the luminance detection signal with a noise level detection signal, and for providing a first output signal;

a memory for receiving a non-linear edge signal, and the first output signal as address signals, said memory producing a signal representative of the amount of noise reduction as a second output signal;

a current frame value altering unit for altering a frame difference value of the subtracted image signal from said subtractor according to the second output signal;

an adder for adding the output of said current frame value altering unit and the current frame image signal and for outputting a noise-reduced signal which is fed back to said horizontal motion compensator;

a first delaying unit for delaying for a predetermined time the noise-reduced signal to be fed back to said horizontal motion compensator; and a second delaying unit for delaying for a predetermined time the current frame image signal to be transmitted to said subtractor and said adder.

2. An adaptive noise reduction apparatus as claimed in claim 1, wherein said logic gates comprise a NOR gate for logically combining a 4-bit luminance motion detection signal, and first and second OR gates each of which is connected to each bit line of a 2-bit noise level detection signal and each for receiving the output of said NOR gate.

* * * * *